United States Patent [19]
Ohnishi et al.

[11] Patent Number: 5,467,224
[45] Date of Patent: Nov. 14, 1995

[54] OPTICAL LOW PASS FILTER AND IMAGING DEVICE USING THE SAME

[75] Inventors: Ikuo Ohnishi; Katsuya Fujisawa, both of Kurashiki, Japan

[73] Assignee: Kuraray Co., Ltd., Kurashiki, Japan

[21] Appl. No.: 145,139

[22] Filed: Nov. 3, 1993

[30] Foreign Application Priority Data

Nov. 6, 1992 [JP] Japan .................................. 4-297221

[51] Int. Cl.[6] .............................. G02B 5/08; G02B 5/26
[52] U.S. Cl. ......................... 359/614; 359/603; 359/884
[58] Field of Search .................................. 359/569, 559, 359/614, 558, 566, 601, 603, 884

[56] References Cited

U.S. PATENT DOCUMENTS

| | | | |
|---|---|---|---|
| 4,795,236 | 1/1989 | Ise ........................................... | 359/569 |
| 4,998,800 | 3/1991 | Nishida et al. .......................... | 359/569 |

Primary Examiner—Paul M. Dzierzynski
Assistant Examiner—Mohammad Y. Sikder
Attorney, Agent, or Firm—Oblon, Spivak, McClelland, Maier, & Neustadt

[57] ABSTRACT

To effectively cut off false signals and false color signals which would occur in an imaging device and also to suppress a reduction in quality of images which would result from a generation of a ring-shaped flare, an optical low pass filter comprises a transparent substrate having first and second surfaces opposite to each other. The optical low pass filter is adapted to be disposed between a photo-taking lens and a solid-state imaging element with the first surface confronting the solid-state imaging element. The first surface of the transparent substrate is formed with a diffraction grating. The transparent substrate used in the optical low pass filter is so designed and so structured as to have a thickness (mm) which satisfies the equation, $2 \cdot g \cdot \tan(\theta_1) + 2 \cdot t \cdot \tan(\theta_c) < 0.9$, wherein g represents the distance of spacing between the first surface of the transparent substrate and an image plane of the solid-state imaging element; $\theta_c$ represents the critical angle at the second surface of the transparent substrate; and $\theta_1$ represents the angle of emission of a first-order diffracted light which takes place when light passing through the transparent substrate is incident on the first surface at the critical angle $\theta_c$.

4 Claims, 4 Drawing Sheets

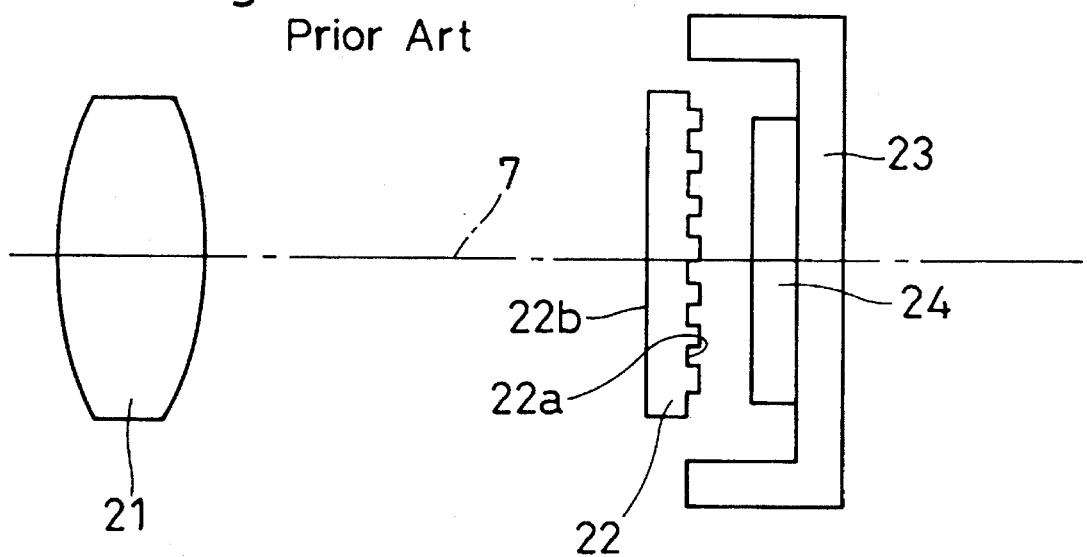

OPTICAL LOW PASS FILTER AND IMAGING DEVICE USING THE SAME

BACKGROUND OF THE INVENTION

1. Field of the Invention

The present invention relates to an optical low pass filter and an imaging device utilizing such optical low pass filter.

2. Description of the Prior Art

An optical color imaging device of a type utilizing a single-plate type solid-state imaging element comprises a color filter array disposed on a solid-state imaging element to provide color signals. If rays of light reflected from an object being imaged contain a high spatial frequency component corresponding to the pitch between the neighboring color filters of the color filter array, the color imaging device outputs false color signals. The solid-state imaging device has a plurality of picture elements disposed discontinuously and regularly in a predetermined pattern and, therefore, if the rays of light reflected from the object being imaged contain a high spatial frequency component corresponding to each neighboring picture elements, the imaging device outputs false signal due to a recurrence of light.

Because of the foregoing, the optical system of the color imaging device of the type utilizing the single-plate type solid-state imaging element is provided with an optical low pass filter having a capability of avoiding generation of both of the false color signals and the false signals. While the optical low pass filter is generally comprised of three or more quartz plates and a single infrared cut-off filter laminated together, such optical low pass filter is known to be difficult to mass-produce and is therefore too expensive.

To overcome the difficulty in mass-productivity discussed above, the optical low pass filter comprising a diffraction grating has been suggested and is known in the art. One example of the imaging device utilizing the optical low pass filter comprising the diffraction grating is illustrated in FIG. 7, reference to which will now be made for the discussion of the prior art imaging device.

The prior art imaging device shown in FIG. 7 comprises a phototaking lens 21, an optical low pass filter 22 in the form of a diffraction grating and a solid-state imaging element 24 arranged in this specified order from an object side where an object to be imaged is situated. The solid-state imaging element 24 is enclosed in a package 23, and the optical low pass filter 22 is fitted to the front of the package 23 while concurrently serving as a protective glass for the solid-state imaging element 24.

It has been found that, when the imaging device of the type utilizing the optical low pass filter 22 as shown n and discussed with reference to FIG. 7 is aimed at a spot of light such as generated from, for example, an automobile headlight or an illuminating lamp, it is often observed that a generally ring-shaped flare shows up around an image of the spot light, accompanied by a reduction in quality of the image. A major cause of the occurrence of the ring-shaped flare around the image of the spot light is a total reflection occurring at a grating surface 22a, which forms a principal surface of the optical low pass filter 22, and another principal surface 22b thereof opposite to the grating surface 22a.

SUMMARY OF THE INVENTION

In view of the problems inherent in the prior art imaging device, the present invention has for its essential object to provide an improved optical low pass filter, and an improved imaging device utilizing the optical low pass filter, which is so designed as to effectively suppress generation of both of the false color signals and the false signals thereby to minimize any possible reduction in quality of the image which would otherwise occur as a result of the occurrence of the ring-shaped flare.

To this end, the present invention provides an optical low pass filter comprising a transparent substrate having first and second surfaces opposite to each other, said first surface of the transparent substrate being formed with a diffraction grating, said optical low pass filter being adapted to be disposed between a photo-taking lens and a solid-state imaging element with the first surface confronting the solid-state imaging element in accordance with the present invention, the transparent substrate used in the optical low pass filter is so designed and so structured as to have a thickness t (mm) which satisfies the following equation:

$$2 \cdot g \cdot \tan(\theta 1) + 2 \cdot t \cdot \tan(\theta c) < 0.9 \tag{1}$$

wherein g represents the distance of spacing between the first surface of the transparent substrate and an image plane of the solid-state imaging element; θc represents the critical angle at the second surface of the transparent substrate; and θ1 represents the angle of emission of a first-order diffracted light which takes place when light passing through the transparent substrate is incident on the first surface at the critical angle θc.

Preferably, the thickness t (mm) of the transparent substrate used in the optical low pass filter according to the present invention is chosen to satisfy the following equation:

$$2 \cdot g \cdot \tan(\theta 1) + 2 \cdot t \cdot \tan(\theta c) < 0.45 \tag{1A}$$

Any one of the foregoing equations (1) and (1A) is descriptive of the radius R of circle of the ring-shaped flare appearing about an image of the spot light cast on the image plane of the solid-state imaging element this radius R of circle of the ring-shaped flare appearing about the image of the spot light is smaller than 0.9, the ring-shaped flare comes to be of a size substantially equal to or smaller than the radius of circle of the image of the spot light, rendering the ring-shaped flare to be trifling or substantially unnoticed. On the other hand, the false color signals and the false signals are cut off by the optical low pass filter.

The imaging device herein provided in accordance with the present invention makes the use of the optical low pass filter of the type referred to above. Preferably, the imaging device herein provided comprises, in addition to the optical low pass filter of the type referred to above and a solid-state imaging element, a spacer interposed between the optical low pass filter and the solid-state imaging element, all of said components being integrated together.

In this imaging device according to the preferred embodiment, since the optical low pass filter is securely fitted to the solid-state imaging element through the spacer, the position of one of the optical low pass filter and the solid-state imaging element relative to the other thereof is accurately and substantial y permanently fixed, making the optical low pass filter exhibit its primary function of suppressing generation of the false color signals and the false signals more effectively.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a schematic side view of the prior art imaging device.

DETAILED DESCRIPTION OF THE EMBODIMENT

Figure 1:
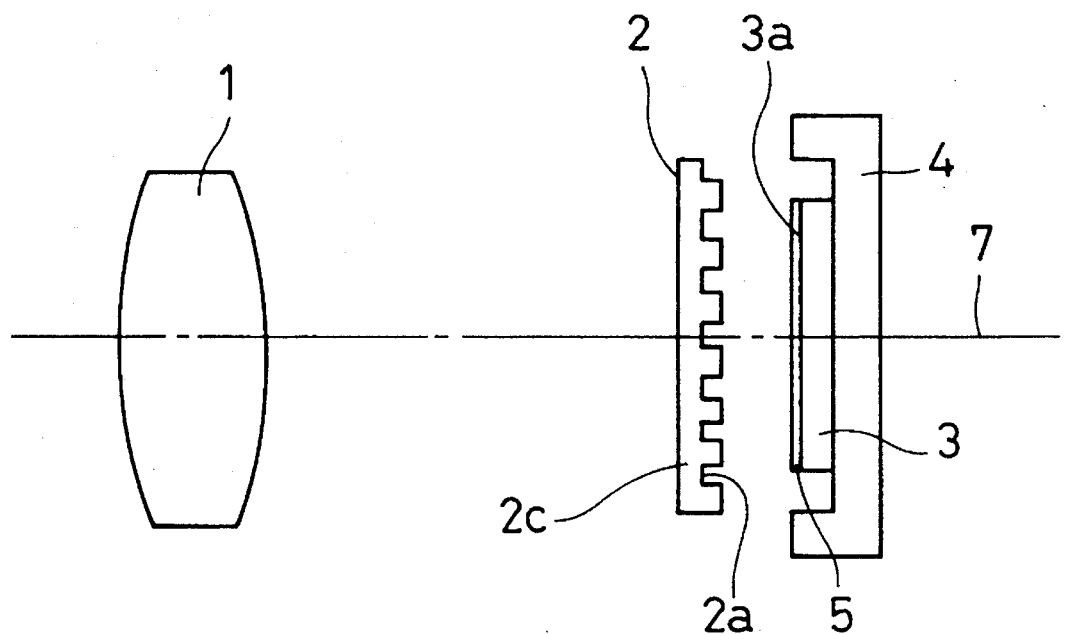
FIG. 1 is a schematic side view of an optical system employing an optical low pass filter according to the present invention.

Before the description of the preferred embodiment of the present invention proceeds, the cause of occurrence of the ring-shaped flare in the imaging device of the type utilizing the optical low pass filter having a diffraction grating will first be discussed with reference to FIG. 2. As is well known to those skilled in the art, the solid-state imaging element 3 includes a Si substrate having front and rear surfaces opposite to each other and a pattern of electroconductive wiring made of aluminum and deposited on the rear surface thereof and has therefore a relatively high surface reflectivity.

Because of the high surface reflectivity, portion of light, for example, that of a spot light reaching the image plane 3a of the solid-state imaging element 3 is reflected from the image plane 3a, and light rays L1 so reflected from the image plane 3a are incident upon the optical low pass filter 2, traveling thereacross from a grating surface 2a, which is a first principal surface of a transparent substrate 2c of the optical low pass filter 2 on which surface the diffraction grating is formed, to a second principal surface 2b thereof opposite to the grating surface 2a. The reflected light rays L1 are diffracted as they pass across the optical low pass filter 2, and the light rays L2 so diffracted subsequently reach the second principal surface 2b, which is a surface of a transparent substrate forming the optical low pass filter 2, so as to be incident thereupon at an incident angle θo. A portion of the diffracted light rays L2 incident upon the second principal surface 2b of the optical low pass filter 2 emerges, as transmitted light indicated by L3, outwardly from the second principal surface 2b and, hence, the optical low pass filter 2 while the rest of the diffracted light rays L2 is reflected backwardly from the second principal surface 2b towards the grating surface 2a as indicated by L4. The light rays L4 reflected backwardly from the second principal surface 2b of the optical low pass filter 2 are, as they reach the grating surface 2a, diffracted again by the grating surface 2a to form transmitted and diffracted light rays L5 which are then projected onto the image plane 3a of the solid-state imaging element 3.

The light rays L2 incident upon the second principal surface 2b of the optical low pass filter 2 at the incident angle θo which is greater than the critical angle determined by the refractive index of air and that of the transparent substrate of the optical low pass filter 2 undergo a total reflection at the second principal surface 2b. On the other hand, the light rays incident upon the second principal surface 2b at an incident angle smaller than the critical angle pass through the second principal surface 2b without being reflected thereby.

In view of the foregoing, the intensity of that portion of the light rays incident upon the second principal surface 2b at an incident angle greater than the critical angle and subsequently reflected therefrom so as to impinge upon the image plane 3a of the solid-state imaging element 3 is considerably high as compared with that of the light rays incident upon the second principal surface 2b at an incident angle smaller than the critical angle and subsequently reflected therefrom so as to impinge upon the image plane 3a of the solid-state imaging element 3. Consequently, the reflected light rays of a higher intensity which have originated from the diffracted light rays impinging upon the second principal surface 2b at the incident angle greater than the critical angle constitute the ring-shaped flare encircling the image of the spot light.

Figure 3:
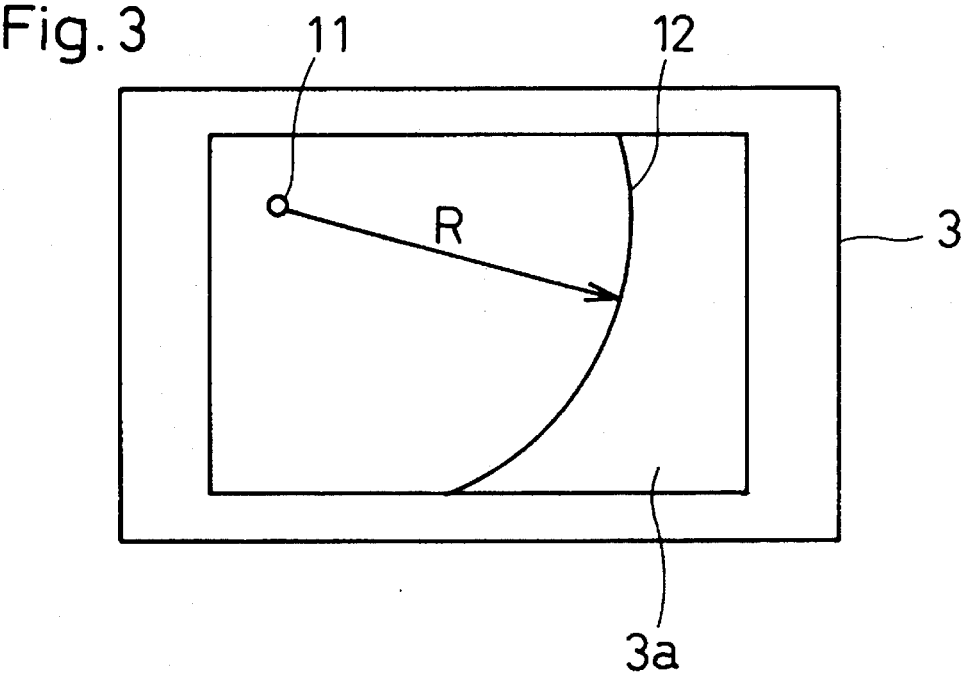
FIG. 3 is a schematic showing an occurrence of the ring-shaped flare on an image plane of the solid-state imaging element.

The image 11 of the spot light and the ring-shaped flare 12 both appearing on the image plane 3a of the solid-state imaging element 3 is schematically illustrated in FIG. 3. As shown therein, the ring-shaped flare shows up in the form of a circle around the image 11 of the spot light.

Referring again to FIG. 2, the distance of spacing between the grating surface 2a of the optical low pass filter 2 and the image plane 3a of the solid-state imaging element 3 is expressed by g (mm); and the thickness of the substrate of the optical low pass filter 2 is expressed by t (mm); the refractive index of the substrate of the optical low pass filter 2 is expressed by n; and the critical angle at the second principal surface 2b of the substrate of the optical low pass filter 2 as referred to hereinbefore is expressed θc. Also, in FIG. 3, the distance from the center of the image 11 of the spot light to that circular portion of the image 12 of the ring-shaped flare 12 which exhibits a maximum intensity of illuminance is referred to as the radius R of circle of the ring-shaped flare 12, which is represented, as shown in FIG. 3, Based on these premises, since the refractive index of air is known to be 1, the critical angle θc is expressed by the following equation (2):

$$\theta c = \sin^{-1}(1/n) \qquad (2)$$

Also, the radius R of circle of the ring-shaped flare 12 is expressed by the following equation (3);

$$\begin{aligned} R &= a1 + b + a2 \\ &= 2 \cdot g \cdot \tan(\theta 1) + 2 \cdot t \cdot \tan(\theta c) \end{aligned} \qquad (3)$$

wherein a1 represents the distance from a point of reflection 7 on the image plane 3a of the solid-state imaging element 3 to an incident point 8 on the grating surface 2a of the substrate of the optical low pass filter 2 as measured in a direction parallel to the solid-state imaging element 3; b represents the distance from the incident point 8 on the grating surface 2a to an exit point 9 on the same grating surface 2a as measured in a direction parallel to the solid-state imaging element 3; and a2 represents the distance from the exit point 9 on the grating surface 2a to an incident point 10 on the image plane 3a of the solid-state imaging element 3 as measured in a direction parallel to the solid-state imaging element 3.

Figure 2:
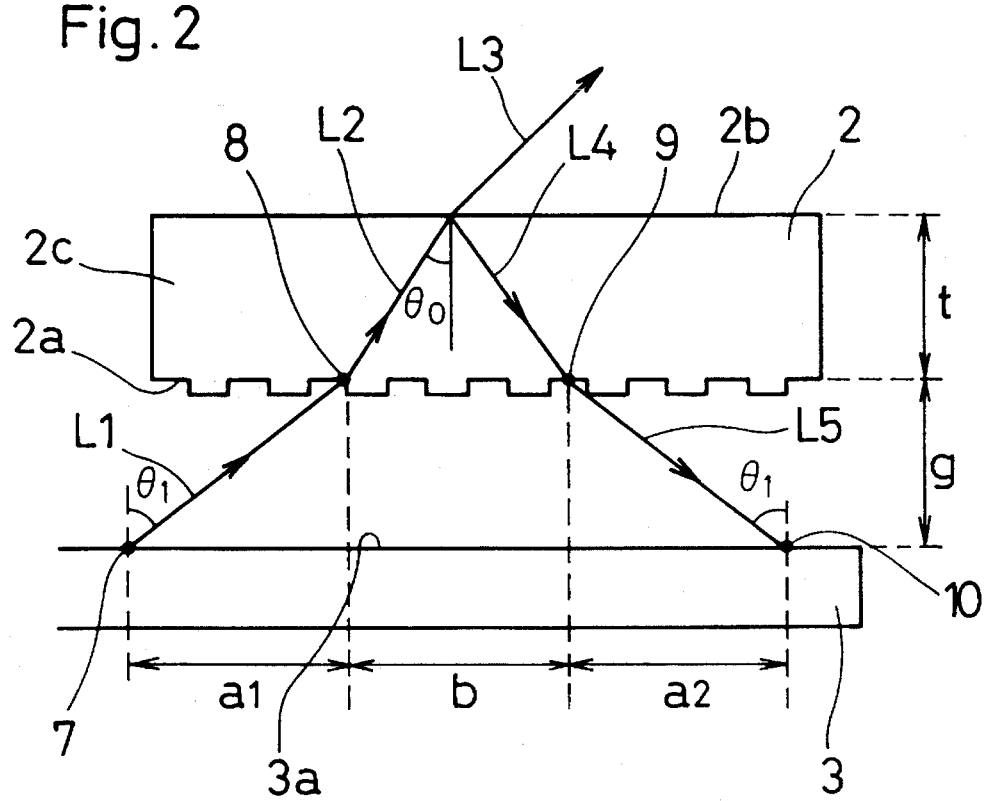
FIG. 2 is a schematic side view of the optical low pass filter illustrating how the ring-shaped flare occurs.

On the other hand, the angle 81 shown in FIG. 2 is given by the following equation (4):

$$\theta 1 = \sin^{-1}\{n \cdot \sin(\theta c) - \lambda/d\} \quad (4)$$

wherein λ represents the wavelength of light and d represents the periodicity of the diffraction grating.

Using the imaging device comprising a ½ inch solid-state imaging element 3, a series of experiments were carried out to evaluate the occurrence of the ring-shaped flare. During the experiment, the thickness t (mm) of the substrate of the optical low pass filter 2 and the refractive index n of the substrate of the optical low pass filter 2 were varied while the distance g between the grating surface 2a and the image plane 3a was fixed at 0.05 mm (50 μm).

The following table 1 shows results of evaluation of the ring-shaped flares which were observed when a glass substrate having a refractive index of 1.52 was employed for the substrate of the optical low pass filter comprising the diffraction grating of 3.85 μm in periodicity on the grating surface, the thickness of which was varied as tabulated in Table 1.

TABLE 1

| Thickness t | Evaluation |
| --- | --- |
| 100 μm | ○ |
| 150 μm | ○ |
| 200 μm | Δ |
| 300 μm | Δ |
| 400 μm | Δ |
| 500 μm | X |
| 600 μm | X |

Results of evaluation of the ring-shaped flares which were observed when a glass substrate having a refractive index of 1.81 was employed for the substrate of the optical low pass filter comprising the diffraction grating of 3.85 μm in periodicity on the grating surface, the thickness of which was varied, are shown in the following table 2.

TABLE 2

| Thickness t | Evaluation |
| --- | --- |
| 100 μm | ○ |
| 150 μm | ○ |
| 200 μm | ○ |
| 300 μm | Δ |
| 400 μm | Δ |
| 500 μm | Δ |
| 600 μm | X |

In each of Tables 1 and 2, the symbol "○" speaks that the ring-shaped flare was little observed; the symbol "Δ" speaks that reduction in quality of the image due to the occurrence of the ring-shaped flare is small; and the symbol "X" speaks that reduction in quality of the image is considerable. If the radius R of circle of the ring-shaped flare 12 is sufficiently smaller than the radius of circle of the image 11 of the spot light, no ring-shaped flare shows up in the image being viewed. This is indicated by ○ in each of Tables 1 and 2 and, in such cases, the radius of circle of the image 11 of the spot light is generally 1 mm or greater.

If the radius R of circle of the ring-shaped flare 12 is equal to or about equal to the radius of circle of the image 11 of the spot light, reduction in quality of the image being viewed is minimum and this is indicated by Δ in each of Tables 1 and 2.

As hereinbefore discussed, the radius R of circle of the ring-shaped flare is expressed by the equation (3):

$$R = 2 \cdot g \cdot \tan(\theta 1) + 2 \cdot t \cdot \tan(\theta c) \quad (3)$$

Accordingly, when the radius R of circle of the ring-shaped flare is smaller than 0.9, or $$R < 0.9 \quad (1)$$

the ring-shaped flare is little observed and, therefore, an acceptable image can be obtained. Specifically, when the radius R of circle of the ring-shaped flare is smaller than 0.45, or $$R < 0.45 \quad (1A)$$

a more acceptable image can be obtained.

It is to be noted that, when the periodicity of the diffraction grating is chosen to be 3.85 μm, the maximum thickness t which satisfies the above condition with respect to the wavelength of 550 nm (representing the center wavelength of the solid-state imaging element) is as follows:

| | If n = 1.52 | If n = 1.81 |
| --- | --- | --- |
| When R < 0.9, | 420 μm | 553 μm |
| When R < 0.45 | 162 μm | 214 μm |

The capability of suppressing the false color signals and the false signal, which is a primary function of the optical low pass filter, will now be discussed. With respect to the MTF (Modulation Transfer Function) of the optical low pass filter comprising the diffraction grating having, for example, a cross-sectional profile of a periodic structure of rectangular indentations, the cut-off frequencies fa and fb of the optical low pass filter can be expressed by the following equations (5) and (6):

$$fa = a/b\lambda \quad (5)$$

$$fb = (d-a)/b\lambda \quad (6)$$

wherein d represents the periodicity of the diffraction grating, a represents the width of each rectangular indentation, b represents the distance between the diffraction grating and the image plane of the solid-state imaging element, and λ represents the wavelength.

Accordingly, the cut-off frequencies of the optical low pass filter are determined by the dimensions a and d and the distance b between the optical low pass filter and the solid-state imaging element. In other words, rays of light of a spatial frequency within the spatial frequency region of fa to fb can be cut off. The spatial frequency which an object originating the false signal is determined by the periodicity of the picture elements of the solid-state imaging element while the spatial frequency which an object originating the false color signals is determined by the periodicity of color combinations of the color filter array. Therefore, if the dimensions a, b and d are properly chosen so as to allow these spatial frequencies to be encompassed within the frequency region of fa to fb, the false signals and the false color signals can be advantageously cut off.

One preferred embodiment of the present invention will now be discussed with particular reference to FIG. 1. An imaging device designed as shown therein in accordance with the present invention comprises a photo-taking lens 1 generally directed so as to aim at an object to be imaged, a solid-state imaging element 3 for converting imagewise rays of light carrying an image of the object into an electric signal, and an optical low pass filter 2. The optical low pass filter 2 has comprises a transparent substrate 2c having a first principal or grating surface 2a and a second principal surface opposite to the grating surface 2a. This optical low pass filter 2 is interposed between the photo-taking lens 1 and the solid-state imaging element 3 with its grating surface 2a facing towards the solid-state imaging element 3.

The imaging device also comprises a color filter array 5 disposed in front of the solid-state imaging element 3 on one side adjacent the optical low pass filter 2. Both of the solid-state imaging element 3 and the color filter array 5 are securely housed within a package 4. Although now shown, but as is well known to those skilled in the art, the photo-taking lens 1, the optical low pass filter 2 and the package 4 accommodating both of the solid-state imaging element 3 and the color filter array 5 are supported by a carrier framework.

Figure 4:
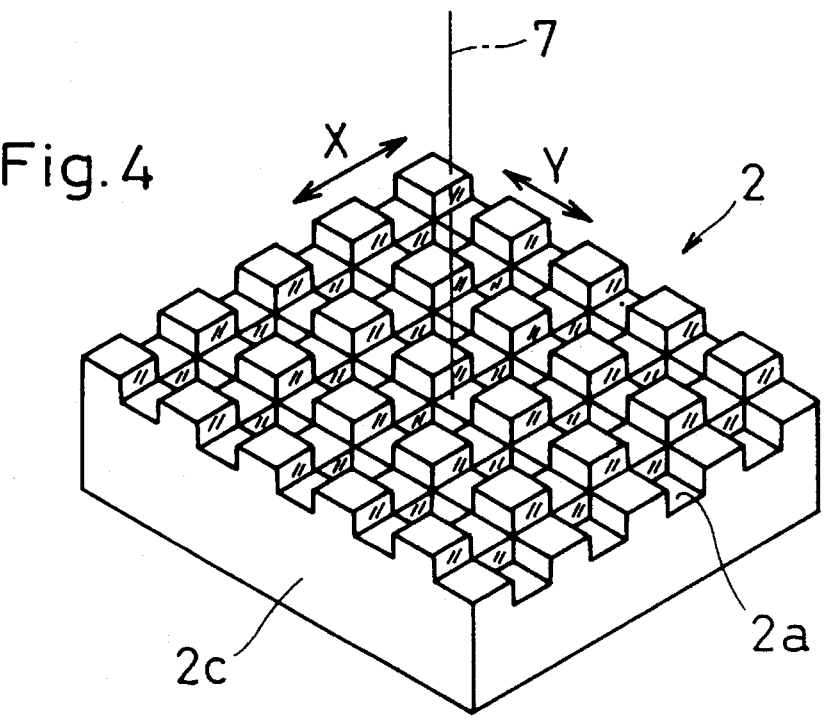
FIG. 4 is a schematic perspective view of the optical low pass filter employed in the optical system shown in FIG. 1.
Figure 5:
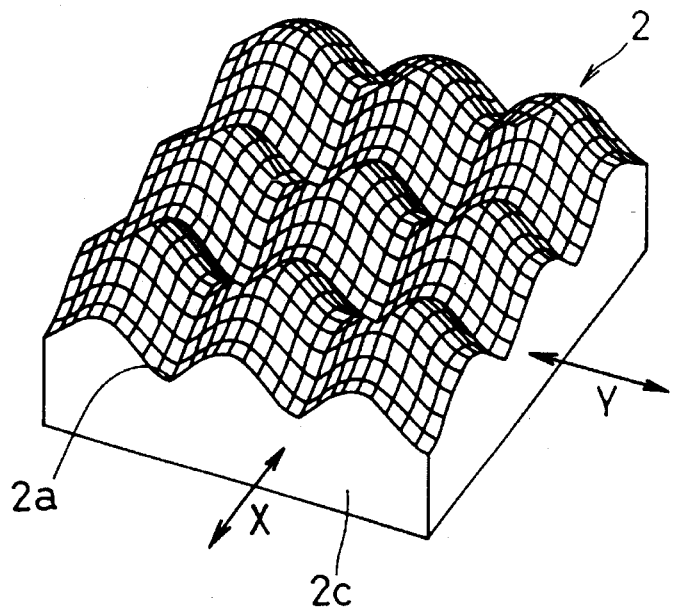
FIG. 5 is a schematic perspective view of another type of the optical low pass filter employable in the optical system shown in FIG. 1.

The optical low pass filter 2 referred to above includes, as shown in FIG. 4, the transparent substrate 2o on which the diffraction grating of a periodic structure including, for example, rows of grating projections extending in respective directions X and Y perpendicular to each other is formed. This optical low pass filter 2 is so disposed with its principal surface lying perpendicular to the optical axis 7 and is supported by the carrier framework (not shown). It is to be noted that the diffraction grating may not be limited to the type having a rectangular cross-sectional shape as shown, but may be of any other type of morphologically modulated grating such as the one having a sine wave as shown in FIG. 5 or a trapezoidal cross-sectional shape, or of any type of gratings having a modulated index of refraction or a modulated index of transmission.

On the other hand, the solid-state imaging element 3 has an image plane 3a and a matrix of a plurality of light sensing elements disposed on the image plane 3a in respective rows extending horizontally and vertically. This solid-state imaging element 3 is disposed with its image plane 3a lying perpendicular to the optical axis 7 and is protected within the package 4 shown in FIG. 1. The respective directions X and Y in which the rows of the grating projections extend are chosen to lie at an angle of 45 degrees relative to the horizontal and vertical directions in which the rows of the light sensing elements extend, respectively.

Figure 6:
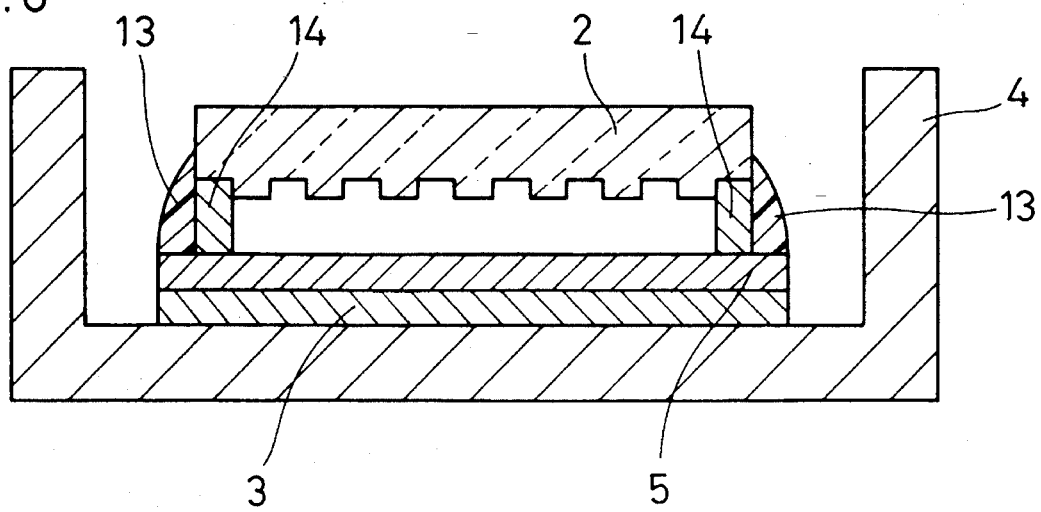
FIG. 6 is a schematic side sectional view of the imaging device utilizable in the optical system according to the present invention.

FIG. 6 illustrates a different embodiment of the imaging device utilizing the optical low pass filter according to the present invention. In this alternative embodiment, the solid-state imaging element 3 having the color filter array 5 enclosed within the package 4, and the optical low pass filter 2 are integrated together through a generally rectangular spacer 14 by means of a bonding material 13. The spacer 14 utilizable in the practice of the present invention may be a metal patterned by the use of an etching technique.

Another method of integrating the solid-state imaging element 3 and the optical low pass filter 2 includes a use of one or more set screws, a bonding agent, a sealing or an integral molding. The spacer 14 referred to above may be a photosensitive resinous film photo-patterned to one or both of the solid-state imaging element 3 and the optical low pass filter 2. Alternatively, the use may be made of a bonding agent containing beads or rods of a predetermined diameter, which beads or rods will serve as a spacer.

In the imaging device shown in FIG. 6, since the position of one of the optical low pass filter 2 and the solid-state imaging element 3 relative to the other thereof is accurately and substantially permanently fixed during the assemblage of the imaging device, the cut-off frequencies fa and fb, for example, discussed in connection with the equations (5) and (6) can conveniently be set accurately and, therefore, generation of the false color signals and the false signals can be suppressed more effectively.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An optical low pass filter which comprises:

a transparent substrate having first and second surfaces opposite to each other, said first surface of the transparent substrate being formed with a diffraction grating, said optical low pass filter being adapted to be disposed between a photo-taking lens and a solid-state imaging element with the first surface confronting the solid-state imaging element, said substrate having a thickness t (mm) which satisfies the following equation:

$$2 \cdot g \cdot \tan(\theta_1) + 2 \cdot t \cdot \tan(\theta_c) < 0.45$$

wherein g represents the distance of spacing between the first surface of the transparent substrate and an image plane of the solid-state imaging element; $\theta_c$ represents the critical angle at the second surface of the transparent substrate; and $\theta_1$ represents the angle of emission of a first-order diffracted light which takes place when light passing through the transparent substrate is incident on the first surface at the critical angle $\theta_c$.

2. An imaging device which comprises:

a photo-taking lens adapted to be aimed at an object to be imaged;

a solid-state imaging element for converting rays of light having passed through the photo-taking lens into an electric signal;

an optical low pass filter including a transparent substrate having first and second surfaces opposite to each other, said first surface of the transparent substrate being formed with a diffraction grating, said optical low pass filter being disposed between the photo-taking lens and the solid-state imaging element with the first surface confronting the solid-state imaging element, said substrate having a thickness t (mm) which satisfies the following equation:

$$2 \cdot g \cdot \tan(\theta 1) + 2 \cdot t \cdot \tan(\theta c) < 0.45$$

wherein g represents the distance of spacing between the first surface of the transparent substrate and an image plane of the solid-state imaging element; θc represents the critical angle at the second surface of the transparent substrate; and θ1 represents the angle of emission of a first-order diffracted light which takes place when light passing through the transparent substrate is incident on the first surface at the critical angle θc.

3. The imaging device as claimed in claim 2, wherein said optical low pass filter and said solid-state imaging element are securely fitted together by means of a spacer.

4. The imaging device as claimed in claim 2, further comprising a color filter array disposed on the image plane of the solid-state imaging element.

* * * * *